Patented May 3, 1938

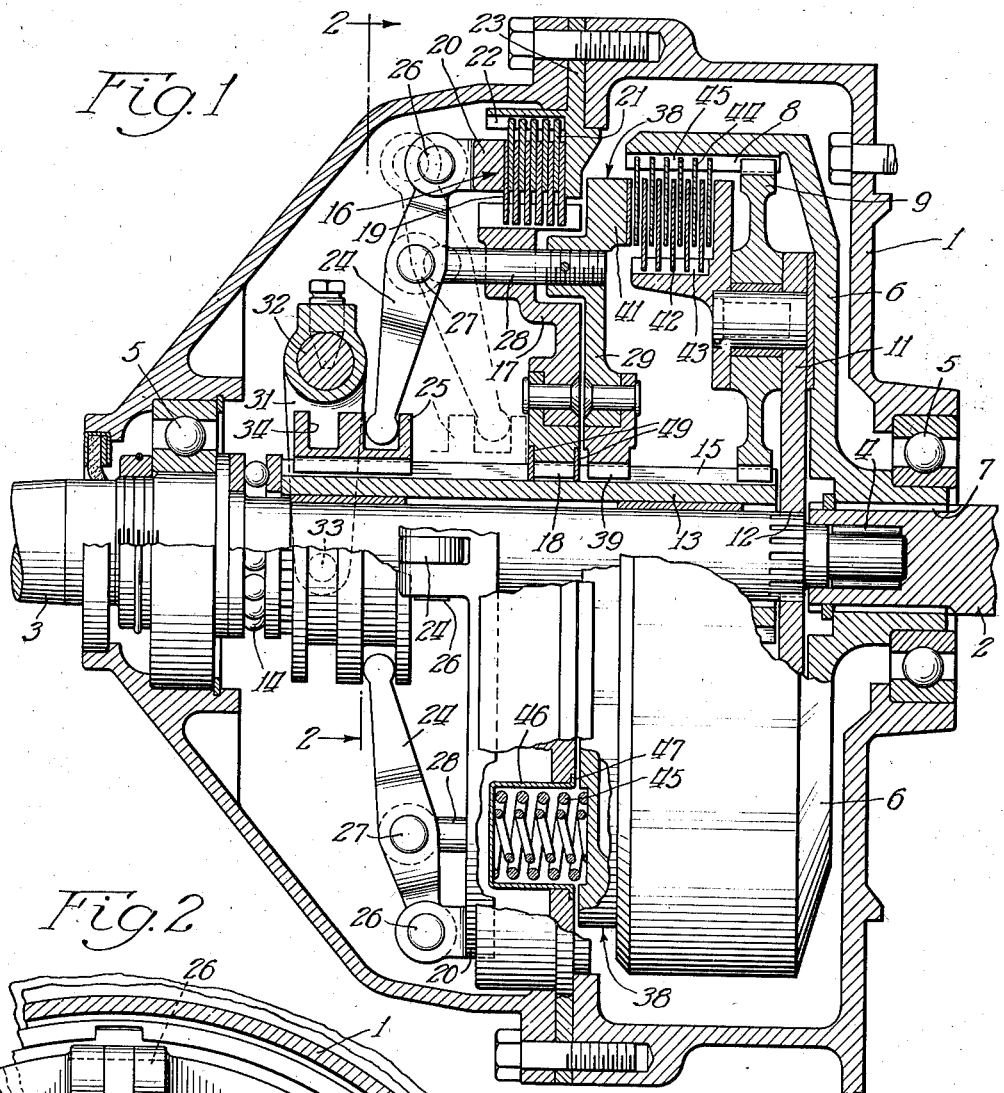

2,115,964

UNITED STATES PATENT OFFICE 2,115,964

PLANETARY GEAR DRIVE

William B. Osborne, Muncie, Ind., assignor to Borg-Warner Corporation, Chicago, Ill., a corporation of Illinois Application September 23, 1936, Serial No. 102,071

4 Claims. (Cl. 74—290)

This application relates to planetary gear drive and more particularly to a planetary gear transmission suitable for use wherever a constant driving connection through the transmission must be maintained, at all times, including the change speed period.

A transmission of the character described herein is particularly well adapted for use in the propeller drive mechanism for aeroplanes where it is desired to provide a decrease in speed of the propeller shaft relative to the engine shaft as during the "take-off" and when the aeroplane is "climbing".

It is an object of my invention therefore to provide an improved planetary gear transmission presenting a plurality of drive ratios, wherein the change from one speed to another may take place without drivingly disconnecting the driving shaft and the driven shaft.

Another object is to provide an improved planetary gear transmission wherein the several parts thereof are assembled in balanced relationship about the axis of the driving and driven shafts thereby to minimize vibrations when the transmission is operating at relatively high speeds.

A further object is to provide an improved planetary gear transmission wherein the moving power transmitting elements of the transmission rotate in unit assembly during direct drive thereby to preclude wear upon the intermeshing gear elements of the transmission.

Other objects, the advantages and uses of the invention will become apparent after reading the following specification and claims, and after consideration of the drawing forming a part of the specification wherein:

Fig. 1 is a vertical sectional view through a transmission constructed in accordance with my invention, and Fig. 2 is a sectional view along the line 2—2 of Fig. 1.

I have selected for illustration, herein, a planetary gear transmission adapted for use between the engine shaft and the propeller shaft of an aeroplane and constructed to provide either a one to one direct drive between the shafts or a reduced speed drive whereby the propeller may rotate at a speed relatively lower than the engine shaft but under increased torque. Obviously the transmission may be constructed for application to other types of vehicle drives as for example the transmission of power from the engine to the propeller shaft of an automobile.

With reference to Fig. 1, the transmission may comprise, a stationary housing 1, an engine shaft 2 and a propeller shaft 3 coaxially aligned with the shaft 3 piloted in the shaft 2 as shown at 4. Suitable anti-friction bearings 5 may be provided for the shafts 2 and 3 as indicated. An internal ring gear 6 is located within the rearward portion of the housing 1 and is splined at 7 to the engine shaft 2. The teeth 8 of the ring gear 6 mesh with the teeth of a plurality of pinions 9, three in the transmission shown, which pinions may be mounted upon a pinion carrier 11. The pinion carrier 11 may be splined as shown at 12 to the propeller shaft 3. A sleeve 13 rotatably mounted upon the propeller shaft 3 and provided with an end thrust bearing 14 is formed on its outer wall with spline-like teeth 15 extending substantially the full length thereof and providing sun teeth for engagement with the pinions 9. The teeth 15 serve also as a spline engageable with other portions of the transmission mechanism as hereinafter described.

It will be apparent from the mechanism thus far described that a reduced speed drive may be established between the engine shaft 2 and the propeller shaft 3, through the planetary gear assembly, upon the holding of the sleeve 13 with its sun gear teeth against rotation relative to the housing 1.

Means for holding the sleeve 13 against such rotation to so establish a reduced gear drive between the engine and propeller shafts may comprise a multiple disc brake generally indicated at 16 introduced between the housing 1 and the toothed sleeve 13. The brake 16 may be formed of a plate 17 splined at 18 upon the sleeve 13 and having assembled thereon, at its outer periphery, a plurality of laterally movable friction discs 19. A second set of friction discs 21, in cooperative relationship to the discs 19, may be assembled as shown at 22 upon an annular support 23 secured to the housing 1. With this arrangement compression of the friction discs 19 and 21 will cause the plate 17, together with the sleeve 13, to be fixed against rotation relative to the housing 1. Means for compressing, or "packing", the friction discs 19 and 21 may comprise a plurality of levers 24 engageable at their outer ends, with a collar 25 and at their inner ends, at 26, with a pressure ring 20. The collar 25 may be splined upon the sleeve 13. The levers 24 may pivot about fulcrum points 27 provided at the outer ends of stud bolts 28, each of the bolts being fixed at their opposite ends to a plate 29. Means for shifting the collar 25 laterally to operate the brake 16 may comprise a shifter yoke 31 fixed to a shaft 32 which extends through the housing 1 and which may be provided at its outer end with a bell crank, or similar arm, for connection with a suitable control to the operator's seat. The outer ends 33 of the bifurcated portion of the yoke 31 may embrace the collar and engage with a groove 34 formed therein forwardly of the point of engagement between the collar and the levers 24.

For the purpose of establishing a direct or 1 to 1 drive between the engine shaft 2 and the propeller shaft 3 I prefer to lock the pinion carrier 11 against movement relative to the internal ring gear 6 and to free the sun gear sleeve 13 so that it may rotate with the planetary gear assembly. For this purpose I provide a multiple disc clutch, generally indicated at 38, which may comprise the plate 29 upon which the stud bolts 28 are carried which plate may be splined at 39 to the sleeve 13 and formed at its periphery to provide a pressure plate 41 in registration with a plurality of friction discs 42 assembled upon the pinion carrier 6, as shown at 43 and a plurality of similar plates 44 assembled upon the internal gear 6, as indicated at 45. The friction discs 44 like the discs 42, 21, and 19 are all free to move laterally relative to their supporting members so that each cooperating pair of friction disc assemblies may be packed together tightly for the purpose of establishing frictional engagement therebetween.

Interposed between the packing plates 17 and 29 of the clutches 16 and 38 respectively I provide a plurality of compression springs 45 each having one of its ends bearing against the plate 29 and each having its opposite end seated within a cup 46. The cups 46 may be secured to the plate 17 by passing the cups through openings in the plate and flanging the cups as shown at 47 so that the flanged portions engage with the rearward face of the plate. Circular stop members 49 may be placed on each side of the plate 17 and fixed to the sleeve 13 to preclude lateral movement of the plate 17 thereby causing the springs 45 to urge the clutch plate 29 toward the clutch discs 42 and 44 whereby the clutch 38 tends normally to be engaged.

With the parts in the position shown in Fig. 1 the sleeve 13 is locked against rotation relative to the housing 1 and the clutch 38 is disengaged against the force of the compression springs 45. Power transmitted from the engine shaft 2 to the propeller shaft 3 must therefore pass through the planetary gear drive to cause the shaft 3 to rotate at a lower speed than the engine shaft 2. It is in this position that the transmission is operated when high torque is required as in "taking off" from the flying field or during climbing to higher altitudes.

If now, the shaft 32 is oscillated, as by manual force, so as to cause the collar 25 to move to its dotted line position, the levers 24 will likewise move to their dotted line positions thus to cause the pressure ring 20 for the brake 16 to move to the left, as viewed in Fig. 1, and to release engagement of the friction discs 19 and 21. This action frees the sleeve 13 so that it is free to rotate together with the plate 17. Simultaneously with this movement of the levers 24 and brake pressure ring 20 the clutch packing plate 29 will be released so that, acting under the force of the springs 45, it may move toward the friction discs 42 and 44 to cause the discs to engage one with another thereby to lock the internal gear 6 with the pinion carrier 11. The transmission is now in a condition to transmit power from the engine shaft 2 to the propeller 3 at a 1 to 1 ratio the internal gear 6, the pinions 9, the pinion carrier 11, the sleeve 13 and the packing plates 17 and 29 are at this time caused to rotate, in unit assembly, with the engine and propeller shafts 2 and 3.

My improved planetary gear transmission possesses particular merit for use as an aeroplane propeller drive where it is little short of disastrous to permit the uncoupling of the engine and propeller shafts while the aeroplane is in the air, for the speed differential between these shafts, at such times, would be so great that a reestablishment of driving connection therebetween might easily mutilate the transmission gear elements. Furthermore it is necessary, in an aeroplane transmission, that the driving connection between the propeller and the engine be maintained at all times so that in the event the engine should stall it may be started again from torque applied through air velocity acting upon the propeller.

It will be noted that, with the clutch arrangement herein described, the transmission may move smoothly from one speed to another and that during the period, between positive action of the reduced speed drive and the direct drive, the engine and propeller shafts are maintained in constant driving relationship one with the other through both the brake 16 and clutch 38, the slip of one giving way to the slip of the other as full engagement thereof takes place.

While I have thus described my invention as embodied in a transmission of the type intended for disposition between the engine and propeller shafts of an aeroplane, it will be understood that the features of the transmission may be incorporated in transmissions applicable for use in other types of vehicles and for power transmission generally and that numerous changes may be wrought in the structural elements thereof without departing from the spirit and scope of the invention as defined in the appended claims.

I claim:

1. In a planetary gear drive, an internal ring gear, a pinion carrier, a plurality of planet pinions mounted on said carrier and engageable with said ring gear, a sun gear engageable with said planet pinions, a driving shaft coupled to said ring gear, a driven shaft coupled to said planet carrier, a brake for restraining said sun gear against rotation, a clutch for restraining said internal ring gear and said planet carrier against rotation one relative to another, said sun gear comprising a long toothed sleeve, a collar splined to said sleeve and adapted to assume a plurality of positions thereon, means for operating said brake, means for operating said clutch, a floating link pivotally connected to said collar and said brake and clutch operating means, and resilient means normally urging said brake and said clutch operating means into operative position, whereby the sum total of pressure on both brake and clutch is substantially constant.

2. In a planetary gear drive, an internal ring gear, a pinion carrier, a plurality of planet pinions mounted on said carrier and engageable with said ring gear, a sun gear engageable with said planet pinions, a driving shaft coupled to said ring gear, a driven shaft coupled to said planet carrier, a pressure operated brake for restraining said sun gear against rotation, a pressure operated clutch for restraining said internal ring gear and said planet carrier against rotation one relative to another, resilient means common to both said brake and said clutch for urging them into operative position, and means for rendering substantially constant the sum total of pressure exerted on both brake and clutch by said resilient means whereby release of one is accompanied by the operation of the other.

3. A planetary gear drive as defined in claim 2, wherein said means for rendering substantially constant the sum total of pressure exerted on both brake and clutch comprises a floating link and an external control for operating said link.

4. In a planetary gear and drive, an internal ring gear, a pinion carrier, a plurality of planet pinions mounted on said carrier and engageable with said ring gear, a sun gear engageable with said planet pinions, a driving shaft coupled to said ring gear, a driven shaft coupled to said planet carrier, a brake for restraining said sun gear against rotation, a clutch for restraining said internal ring gear and said planet carrier against rotation one relative to the other, said sun gear comprising a long toothed sleeve rotatably mounted on said driven shaft, a pressure plate splined to said sleeve and adapted to operate said planet gear clutch, a pressure plate for operating said sun gear brake, means including a floating link for connecting said pressure plates, spring means for urging said planet gear clutch into operative position, and a collar splined to said sleeve and engaging said floating link for operating said brake and clutch, said collar in its extreme positions causing operative pressure to be exerted exclusively on one or the other of the pressure plates and in its intermediate positions to cause pressure removed from said brake or said clutch to be applied to the other.

WILLIAM B. OSBORNE.